United States Patent [19]
Vianello et al.

[11] Patent Number: 5,934,982
[45] Date of Patent: Aug. 10, 1999

[54] DEVICE FOR REMOVING COATINGS APPLIED TO THE SURFACE OF A GLASS PLATE

[75] Inventors: Fortunato Vianello, Vallio di Roncade; Dino Moschini, San Cipriano, both of Italy

[73] Assignee: For.El. Base di Vianello Fortunato & C. S.n.c., Vallio di Roncade, Italy

[21] Appl. No.: 08/725,582

[22] Filed: Oct. 15, 1996

[30] Foreign Application Priority Data

Oct. 20, 1995 [IT] Italy .................................. TV95A0125
Apr. 12, 1996 [IT] Italy .................................. TV96A0050

[51] Int. Cl.$^6$ ...................................................... B24B 9/08
[52] U.S. Cl. ................................. 451/44; 451/49; 451/119
[58] Field of Search .................................. 451/119, 49, 44

[56] References Cited

U.S. PATENT DOCUMENTS 3,598,100   8/1971   Deprez .
4,060,938  12/1977   Barron, Sr. ................................... 51/110
4,716,686   1/1988   Lisec ........................................ 51/76 R
5,371,973  12/1994   Kaiser et al. ............................... 451/62
5,449,312   9/1995   Lisec ........................................... 451/5

FOREIGN PATENT DOCUMENTS

0 165 232  12/1985   European Pat. Off. .
0 517 176  12/1992   European Pat. Off. .

Primary Examiner—Scott W. Houtteman
Attorney, Agent, or Firm—Guido Modiano; Albert Josif

[57] ABSTRACT

The device for removing coatings from the surface of a glass plate comprises at least one head which is movable along the rim portion of the glass plate, and at least one motorized tool provided at the head. The tool is of the cup-shaped type and has an active flat surface for treating the coatings. The tool is contacting the glass plate coating on an annular portion of the flat surface thereof.

21 Claims, 9 Drawing Sheets

DEVICE FOR REMOVING COATINGS APPLIED TO THE SURFACE OF A GLASS PLATE

BACKGROUND OF THE INVENTION

The present invention relates to a method and a device for removing coatings constituted by one or more layers deposited on the surface of a glass plate.

It is currently known to perform, during the manufacture of special glass plates, a treatment known as for "low emissivity", which substantially has the purpose of constituting a barrier to the passage of infrared rays, therefore limiting the outward transmission of heat from indoor spaces.

This treatment consists in applying a plurality of layers of material at the entire surface of a glass plate to be subsequently perimetrically associated, by means of a first seal of butyl sealant, at the lateral surfaces of a spacer frame, so as to form the inner chamber of an insulating glazing panel.

A typical sequence of layers is the following, starting from the surface of the glass plate, for the so-called "magnetron" quality: a first nonconducting layer of tin oxides that is strongly anchored to the glass and is approximately 300 angstrom thick.

A second conducting layer of silver, approximately 100 angstrom thick, and a third conducting layer of aluminum, approximately 35 angstrom thick, are applied over the first layer.

A fourth nonconducting layer of tin oxides is then provided, which is approximately 300 angstrom thick and has substantially protective characteristics.

Glass plates thus treated must be protected appropriately by means of a plurality of provisions, starting with packaging and ending with processing, until they constitute the double-glazing unit and therefore, since their treated surface faces the inside of the double-glazing unit, they are no longer exposed to the aggressive action of atmospheric agents.

However, the unalterability of said layers can be achieved only if the continuity of the coating is interrupted towards the outer rim of the glass plate; this continuity, even if atomic in thickness, would in fact be sufficient to trigger the oxidation of the outer rim of the glass plate towards the inside of the insulating glazing panel, consequently compromising characteristics that are indispensable for the good quality of the insulating glazing panel, such as the anchoring of the sealant that constitutes the second seal, the anchoring of the sealant that constitutes the first seal, the effectiveness of the "low emissivity" coating, and aesthetics.

Accordingly, the layers proximate to the perimetric rim of the glass plates are conventionally removed.

Accordingly, removal is conventionally performed by using heat as a layer-removing element; it is thus known to use a torch fueled with combustible gas, whose flame is passed at said rim of the glass plate.

However, this solution has now been abandoned, since an insufficient quality of the result has been observed in addition to objective difficulty in automating the process.

Removal is also conventionally performed by means of an electrical discharge (reference should be made to U.S. patent application Ser. No. 08/546,641); although this method is highly effective, also in view of the fact that it does not alter the surface of the glass plate in any way, it still has the limitation of a low feed motion speed.

In this field, it is also known to remove the layers at the rim of the glass plate by removing the layers by grinding, which is performed with a cylindrical grinding wheel the active part whereof is constituted by the outer generatrix, which is the only part that makes direct contact with the perimetric band of the glass plate.

The backing of the abrasive mix is usually constituted by rubber-like material having a low hardness value, so that the action against the surface of the glass plate is as tolerable as possible.

This conventional method substantially consists in passing over the perimeter of the glass plate with a cylindrical grinding wheel; the glass plate is placed on a horizontal surface so that the part to be treated faces upwards.

This conventional manual method has considerable drawbacks, since there is absolutely no control over the pressure of the grinding wheel against the surface of the glass plate except for the control based purely on the operator's sensitivity.

Furthermore, the resulting dust, which contains abrasive particles and other foreign particles constituted by the material of the mix, is a dangerous contaminant for the glass plate and particularly for its treated surface, which is highly sensitive, especially during the grinding operation known as edging, and in subsequent treatments, ranging from washing to the coupling of two or more glass plates to form the insulating glazing panel.

It is also known to perform removal by grinding with a semiautomatic method differing from the previous one in that the operation is still performed on a horizontal bed but the feed motion, too, is motorized in addition to the cutting motion.

Manual action, however, is still present in the operations for centering the glass plate and for starting and stopping the grinding machines on each side.

In both of these procedures, the effectiveness of dust aspiration is uncertain, due both to the low power levels installed on such machines and to the horizontal arrangement of the glass plate; accordingly, there are still considerable problems in terms of contamination of the glass plate surface.

Removal by automatic grinding is also conventionally performed, which occurs, again by virtue of the action of one or more cylindrical grinding wheels the active part whereof is constituted by the outer generatrix, on a glass plate arranged slightly at an angle with respect to the vertical plane; in addition to being performed fully automatically along the entire perimeter of the glass plate, either exclusively through the feed motion of the grinding machine or through the combination of the feed motions of the grinding machine and of the glass plate, it also introduces an attempt to control the pressure of the grinding machine against the glass plate surface.

However, this control is not easy to perform because of the size of the glass plate; because one must work at its rim and therefore in a boundary condition; because contact between the grinding wheel and the glass plate occurs only at the outer generatrix of the grinding wheel and therefore along a segment, not at a surface, also in view of the fact that any elastic deformability of the grinding wheel is not appreciable; because of the variability of the characteristics of the grinding wheel; because the diameter of the grinding wheel varies as a function of wear; and finally, because the glass may be abraded owing to the low thickness of the applied layers.

An example of the mentioned method is given by European patent EP 0165232, which, however, shows all the drawbacks mentioned above.

European patent EP 0 517 176 A1 is also known in which a method and a device for preparing a glass plate that is coupled to a multiple glazing unit are disclosed, wherein at least one plate is provided with a coating; from said patent a teaching is available that is based on the concept of using a grinding wheel that operates so that only its outer generatrix is in contact with the glass plate, and said method and said device are applied directly on a horizontal cutting bed, so as to remove the coating in the region that straddles the position of the cutting line and then cut the glass plate on the same machine.

All conventional removal methods are thus substantially penalized by the disadvantageous system for providing contact between the grinding wheel and the glass plate, with the consequent drawback of damaging the surface of the glass plate, which therefore has roughness and altered compositions which are not adapted for the correct anchoring of the first seal, which is constituted by a butyl sealant, and of the second seal, which is performed with polysulfide, polyurethane or silicone sealants; another drawback is that the active surface of the coating of the glass plate becomes contaminated with abrasive dust; yet another drawback is that it is difficult to adjust the force with which the grinding wheel presses against the glass plate.

SUMMARY OF THE INVENTION

A principal aim of the present invention is therefore to solve the described problems, eliminating the drawbacks of the cited prior art, and thus providing a method and a device that allow to treat, either manually or automatically, the rim of glass plates whereon coatings constituted by one or more layers are applied, at the same time allowing the optimum anchoring of the first and second seal to form the insulating glazing panel.

Within the scope of this aim, an object is to remove only the coating without affecting the surface of the underlying glass plate.

Another object is to provide a method and a device that do not contaminate in any way the surface of the coating in the region that remains active and therefore in the region that lies inside the double-glazing unit.

Another important object is to provide a method and a device which, as a consequence of the treatment of the rim of the glass plate, also allows to prevent the oxidation of the layers and therefore maintains all the physical and aesthetic characteristics of the treated glass plate.

Another object is to reduce the consumption of abrasive grinding wheels, since in the prior art linear contact entails an excessive wear for said grinding wheel.

Another object is to provide a device that allows to delimit, precisely and as required, the treated surface of the glass plate.

Another object is to provide a method and a device that are both reliable and safe in use.

This aim, these objects, and others that will become apparent hereinafter are achieved by a method for removing coatings constituted by a plurality of layers deposited on the surface of a glass plate, said method comprising, optionally in a different sequence, a first step for loading and transferring said glass plate so that it is adjacent to at least one first motorized grinding wheel, followed by a second step for placing said at least one first grinding wheel adjacent to said coating, followed by a third step for the relative motion of said at least one first grinding wheel on at least one side of said glass plate.

The said at least one grinding wheel is of the cup-shaped type and interacts with said coating by producing a surface contact that occurs at its flat surface and therefore along an annular portion; and by a device for removing coatings constituted by a plurality of layers deposited on the surface of a glass plate, said device being constituted by at least one first head, which is movable along the rim of said glass plates, and by at least one optional second fixed head, said heads being respectively provided with a first grinding wheel and with an optional second grinding wheel, said grinding wheel or wheels being motorized and of the cup-shaped type the flat surface whereof is the active surface that treats said coatings in an annular portion.

Advantageously, the device is also characterized in that it provides an orientation of the rotation axis of a cup-shaped tool about a point-like fulcrum, so that said axis can be inclined, with respect to the plane lying at right angles to said glass plate, in the plane lying at right angles to the perimeter of the glass plate, in the plane that lies at right angles to the glass plate and is tangent to the perimeter of the glass plate, and in both planes combined.

BRIEF DESCRIPTION OF THE DRAWINGS

Further characteristics and advantages of the invention will become apparent from the following detailed description of some particular but not exclusive embodiments thereof, illustrated only by way of non-limitative example in the accompanying drawings, wherein.

DESCRIPTION OF THE PREFERRED EMBODIMENTS

With reference to the above figures, the reference numeral 1 designates a glass plate of the type that can be coupled, together with a similar glass plate, by means of a first seal, at a spacer frame so as to thus constitute an air space of an insulating glazing panel.

The spacer can be constituted by a closed and internally hollow profile having adapted microperforations on the surface located at the air space and adapted hygroscopic materials inside it.

A coating 3 (see FIGS. 4 and 9) is applied to said glass plate 1 at the surface 2 that will be in contact with the air space of the insulating glazing panel (in case of complete removal); said coating is constituted by a plurality of layers of material of the type used, for example, for the so-called "low emissivity" treatment or in any case for other treatments, such as, in a non-limitative sense, those for tinting a glass plate or for making it reflective or photochromatic.

Figures 4, 9:
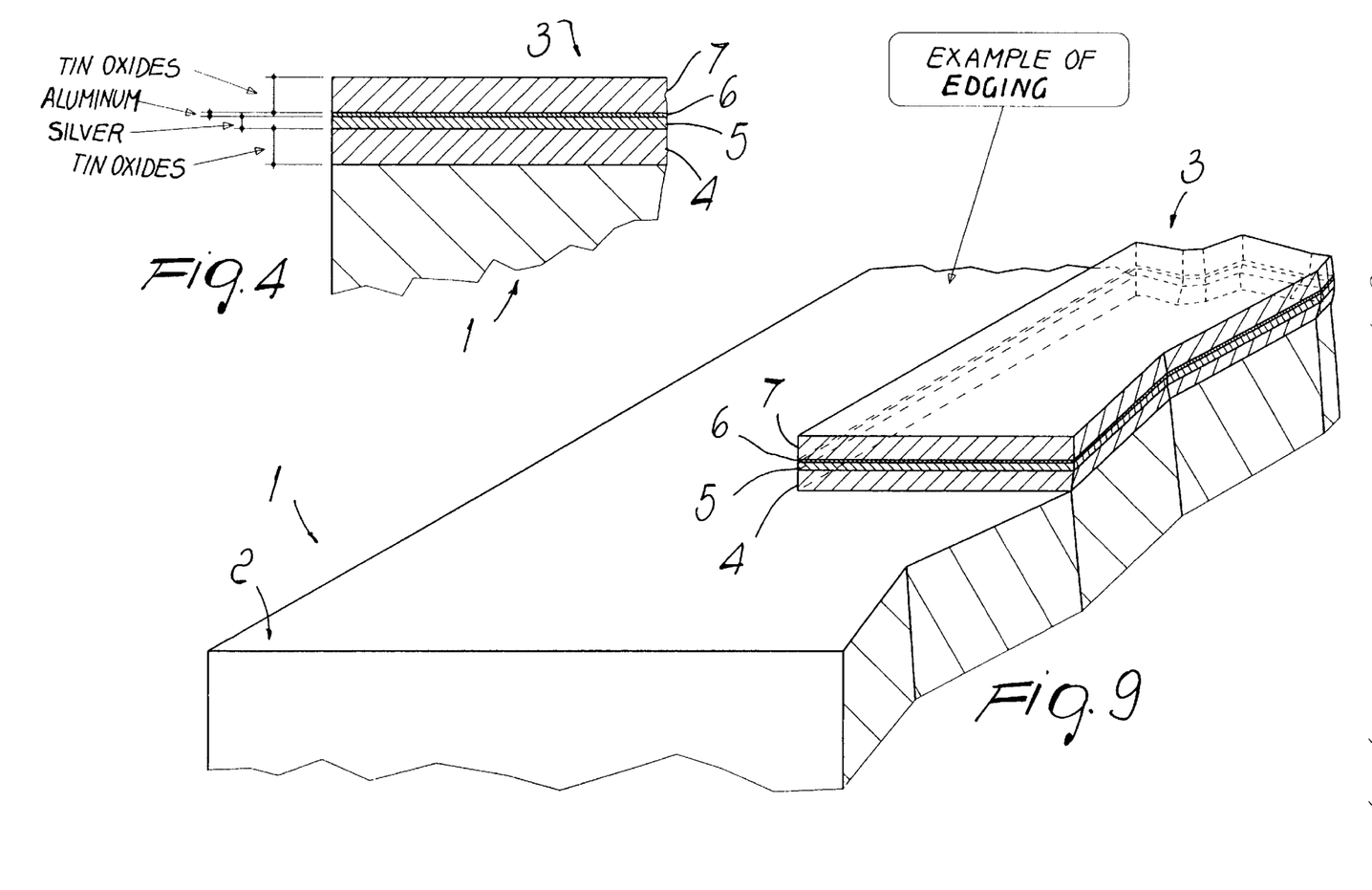
FIG. 4 is a transverse sectional view, in enlarged scale, of some layer application on the surface of a glass plate.
FIG. 9 is a partially sectional lateral perspective view, in slightly enlarged scale, of an example of the removal of the layers.
Figure 5:
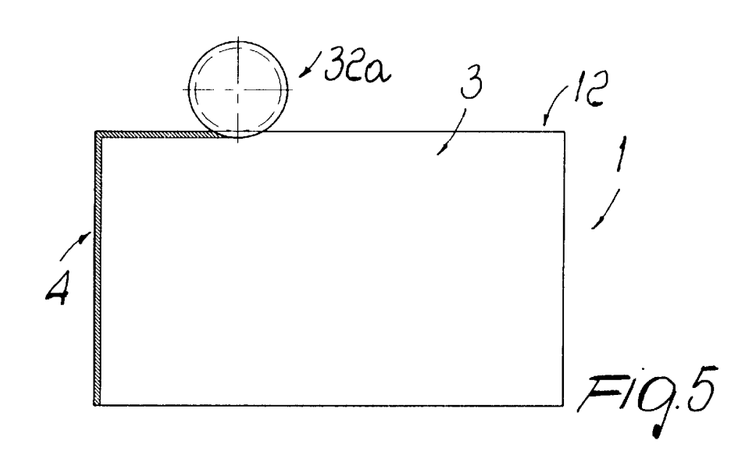
FIGS. 5 and 6 are schematic views of the use of the device in two possible configurations, such as rectangular glass plates and contoured glass plates.
Figure 6:
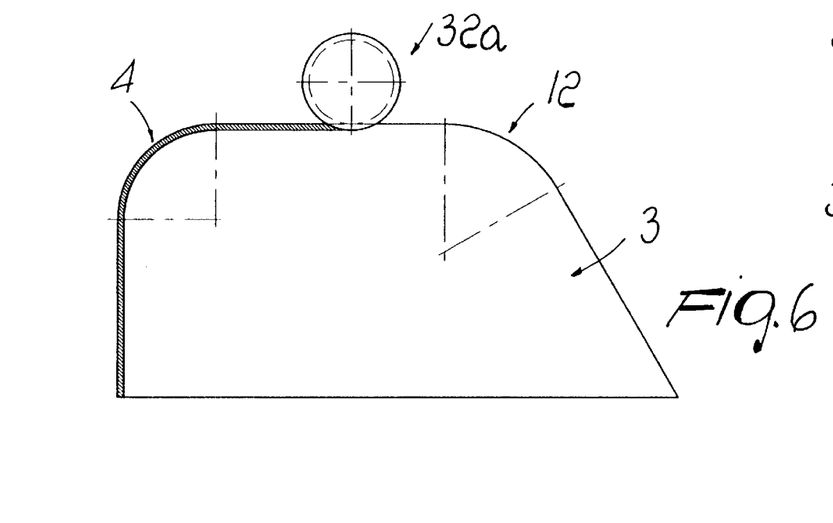
Figure 7:
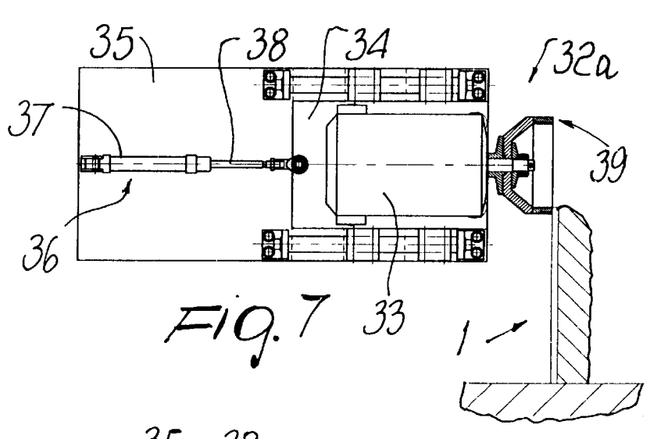
FIG. 7 is a schematic front view of the device.
Figure 8:
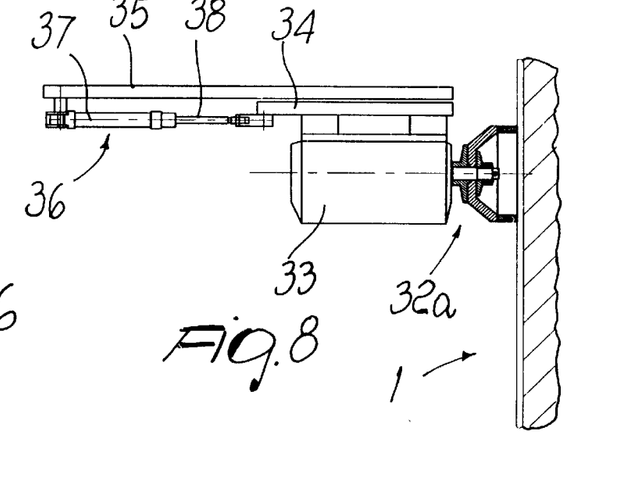
FIG. 8 is a schematic top view of the device.

The described solution, which is presented merely by way of example, considers, starting from the surface 2, a first nonconducting layer 4 of tin oxides, over which a second conducting layer 5 of silver and a subsequent third conducting layer 6 of aluminum are applied.

There is also provided a fourth nonconducting tin oxide layer 7 having mainly protective characteristics.

Figure 1:
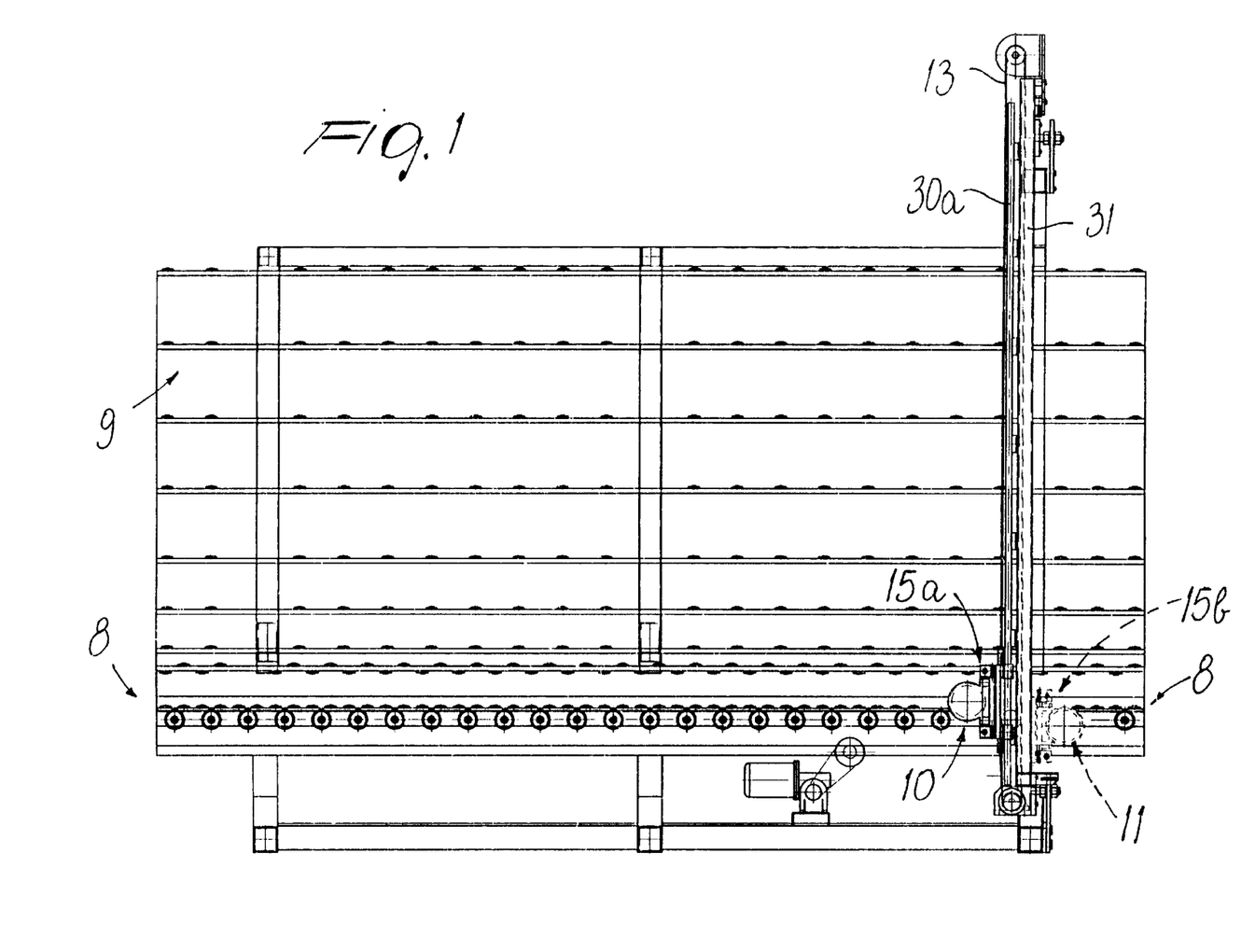
FIG. 1 is a front view of a rack and a train of rollers for conveying the glass plate and of the device applied at the vertical carriage and, in dashed lines, the device fixed to the lower part of the train of rollers so as to allow treatment of the horizontal side of the glass plate as well.
Figure 2:
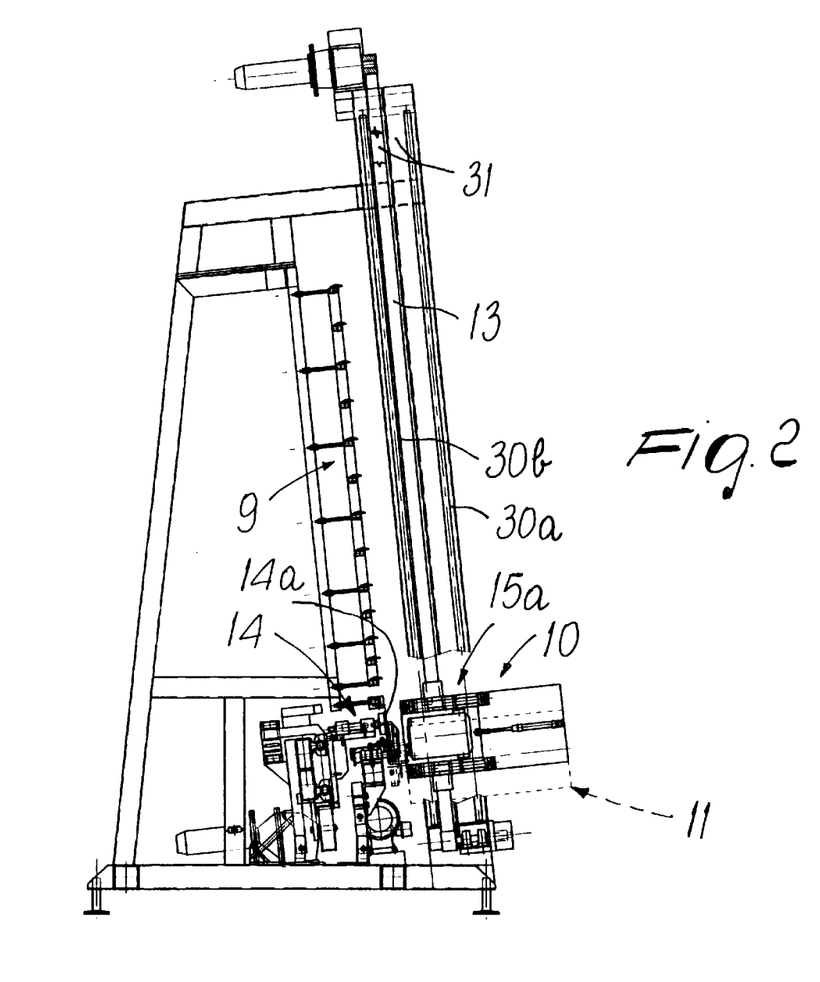
FIG. 2 is a side view of the elements of FIG. 1.

The glass plate 1 can be conveyed by means of an adapted train of rollers 8 for downward support and a rack 9 for rear support; said train of rollers and said rack allow to convey the glass plate to the coating removal device.

Said device is constituted by a first movable head 10 and by an optional second fixed head 11; the first head 10 is associated with an adapted motorized belt 13 and is allowed to move substantially vertically, whereas the optional second head 11 acts at the lower rim 12 of the glass plate 1.

Said motorized belt 13 is allowed to move substantially vertically along a vertical bridge that can optionally also perform a horizontal translatory motion.

A first carriage 14 for feeding the glass plate horizontally is also provided; said carriage, by means of adapted suckers 14a, engages the glass plate on the side lying opposite to the side surface 2 and conveys it towards the coating removal device.

Figure 3:
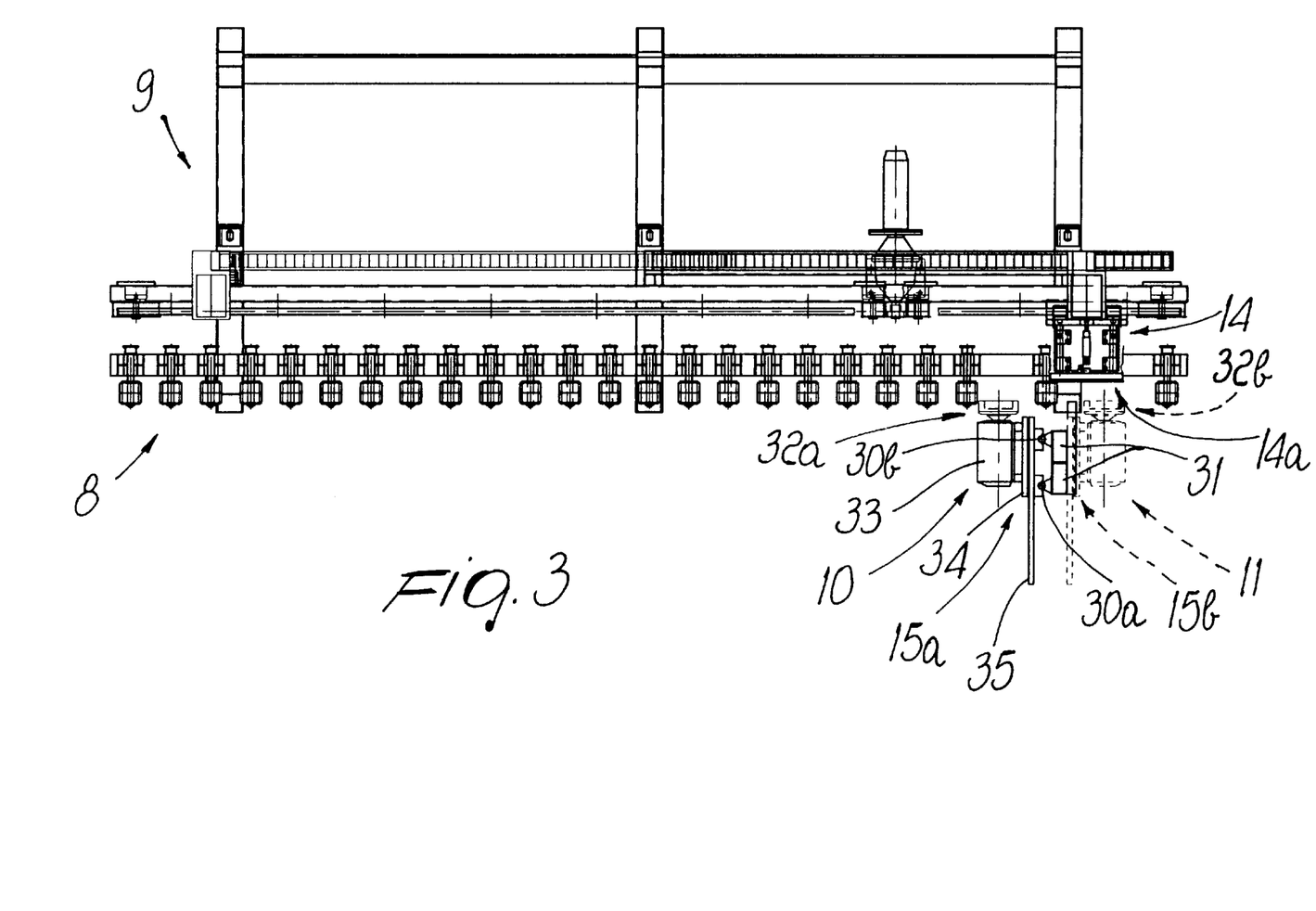
FIG. 3 is a top view of the elements of FIG. 1.

There is also provided a second carriage 15a for the vertical movement of the first head 10 along two guides 30a and 30b that are associated with posts 31; the optional second head 11 is instead rigidly coupled, by means of a plate 15b, to the lower end of said posts 31, as shown in FIG. 3.

Said first head and said optional second head respectively have, in the illustrated solution, a tool, such as a grinding wheel 32a and 32b, that is cup-shaped and is actuated by a motor 33 mounted on an adapted slider 34 that can move axially with respect to a support 35 by means of an actuator 36, such as pneumatic piston, the body 37 whereof is rigidly coupled to the support 35 and the stem 38 whereof is associated with the slider 34.

The two guides 30a and 30b constitute the reference for the vertical movement of the support 35.

Each grinding wheel operates tangentially through the contact of part of its flat face 39 against the surface 2 of the glass plate that bears the coating 3 to be removed.

The method in fact entails a first step during which the glass plate is loaded onto the rack 9 and is then conveyed to a reference position for the first head and the optional second head, said second head being arranged in a position that is offset with respect to the first head so as to avoid interfering therewith; in a second step, said first and second heads are sequentially moved into contact with the coating 3 proximate to the rim 12, after starting the motors that drive said heads.

This is followed by a third step, during which the second carriage 15a is powered so as to produce the vertical stroke to treat the first vertical side of the glass plate.

This step and the subsequent ones are controlled by centralized logic units of the numeric-control type that allow, either by using only the first grinding wheel or by using said first grinding wheel in combination with the second grinding wheel, the sequence of movements that allows travel over the entire perimeter of the glass plate both if said glass plate has a rectangular or a contoured shape.

It has thus been observed that the invention has achieved the intended aim and objects, a method and a device having been provided that allow to avoid damaging the surface of the glass plate, to eliminate or considerably limit the production of dust, which would cause contamination or be abrasive; it is also possible to use abrasive grinding wheels having a harder mix than the mix used for the grinding wheels used in the described conventional devices, thus allowing to use grinding wheels that are subject to negligible wear.

Simplification of the devices for adjusting the force applied to the grinding wheel to achieve optimum contact between the grinding wheel and the glass plate has also been observed.

The present invention is of course susceptible of numerous modifications and variations, all of which are within the scope of the same inventive concept.

Accordingly, the layers that constitute the coating may be of any kind, and the combination of said layers may also be of any kind.

The device also comprises adapted electronically-driven actuators for controlling the movement of the glass plate and/or of the first and second heads provided with the tools; said actuators regulate, in a controlled manner, their interconnections in order to produce the rectangular or contoured path of the perimeter of the glass plate and the conditions of the acceleration and deceleration ramps of said glass plate and/or said heads.

The device can also comprise one or more suction hoods that are adapted to remove the minimal emission of dust produced by the microabrasion of the coating according to the invention.

The method can of course occur fully automatically or semiautomatically or manually.

Finally, it is noted that removal of one or more layers of the coating of the glass plate can be performed while said glass plate is arranged substantially vertically or on a horizontal plane or on an inclined plane.

An additional device is shown in FIGS. 11 to 15 in order to further improve the performance of the tangential grinding described above, and therefore to achieve a "softer" action on the surface of the glass plate, the perfect definition of the border between the edged part and the intact part, treatment even on glass plates that are not perfectly flat, and a considerable increase in tool life.

In this solution, the device has been allowed to undergo an orientation, about its spherical fulcrum, that eliminates or reduces to an acceptable value the pressure of the grinding wheel in its linear portion that makes contact with the edge of the glass plate. This would in fact be the most critical region, since the sharp edge of the glass plate behaves like a cutting edge that "redresses" the face of the grinding wheel, especially in view of the low consistency of the supporting mix that is typical of grinding wheels meant for this type of treatment because they must have cutting characteristics that are adapted to remove the coating without altering the surface of the glass plate.

This orientation is achieved by redirecting the rotation axis of the cutting motion of the tool with respect to the condition in which it lies at right angles to the glass plate. This redirection is performed on two planes: one is perpendicular to the perimeter of the glass plate and one is parallel to the perimeter of the glass plate and perpendicular to said glass plate. Redirection on the plane that lies at right angles to the perimeter of the glass plate is performed by means of an eccentric element (which can be adjusted manually or by means of a servomechanism); redirection on the plane lying parallel to the perimeter of the glass plate is performed by making the eccentric element perform an angular movement, in advance or delayed with respect to the mutual advancement of the tool and of the glass plate (by means of a servomechanism); this movement also produces a component of redirection along the plane lying at right angles to the perimeter of the glass plate.

The condition of this redirection of the rotation axis of the cutting motion of the tool is constantly updated with respect to the perimeter of the glass plate by means of an electronic logic unit that coordinates the correlation between the three axes: the first two axes relate to the movement of the horizontal slider and to the movement of the vertical slider, combination whereof follows the contour of the glass plate (whether rectangular or otherwise shaped), and the third axis is related to the redirection of the rotation axis of the cutting motion of the tool.

The first two axes are described in the previously presented solution, to which reference is made; the third axis is instead the subject of the present solution and is described more clearly hereinafter with reference to FIGS. 12 to 15. The motor 100, which provides the cutting motion to the tool or grinding wheel 102, is articulated to the spherical fulcrum composed of the mechanism 105 at the end of said motor on the protruding shaft 103 whereof the tool locking system 104 is rigidly coupled; said motor 100 is articulated to an eccentric element 106, provided with an actuator 107, at the opposite end. The eccentric element 106 allows to adjust the inclination of the rotation axis on the plane lying at right angles to the perimeter of the glass plate and the actuator 107 allows to rotate said plane, giving it a component that lies on the plane arranged at right angles to the perimeter of the glass plate and a component that lies on the parallel plane, and allows to update the orientation of said plane as a function of the shape of the perimeter of the glass plate. Accordingly, the combination of the eccentric element 106 and of the actuator 107 allow the desired choice of the components of the orientation of the rotation axis of the tool 102 in the two planes that lie, respectively, at right angles and parallel to the perimeter of the glass plate.

In one of the possible but not exclusive embodiments, the actuator 107 is composed of a shaft 108 that is rigidly coupled to the adjustable eccentric element 106 and is supported by a support 109; a toothed pulley 110 is keyed on said shaft and is driven by a belt 111 actuated by a toothed pulley 112 that is keyed on the driving shaft 113 that constitutes the actual third electrical drive movement axis.

A sensor 114 is also provided for recognizing the zero position (set point) in order to reset the articulation of the head every time after the machine has been switched off.

Figure 10:
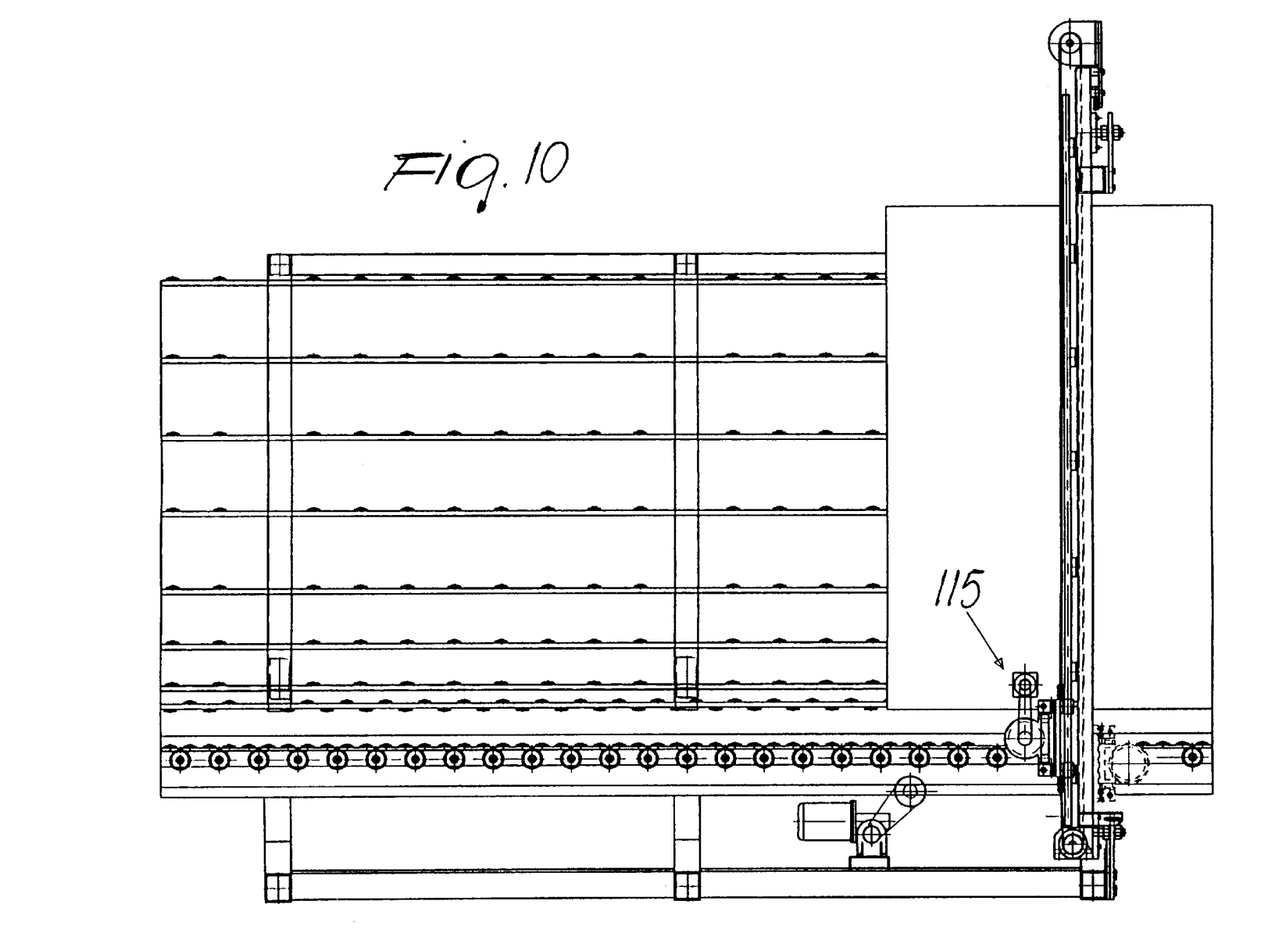
FIG. 10 is a front view of a rack and a train of rollers for conveying the glass plate and of the edging head (which includes the device according to the present invention), applied at the vertical carriage, and, in dashed lines, of an optional second edging head that is fixed to the lower part of the train of rollers for the optional treatment of the lower horizontal side of the glass plate simultaneously with the upper horizontal side.
Figure 11:
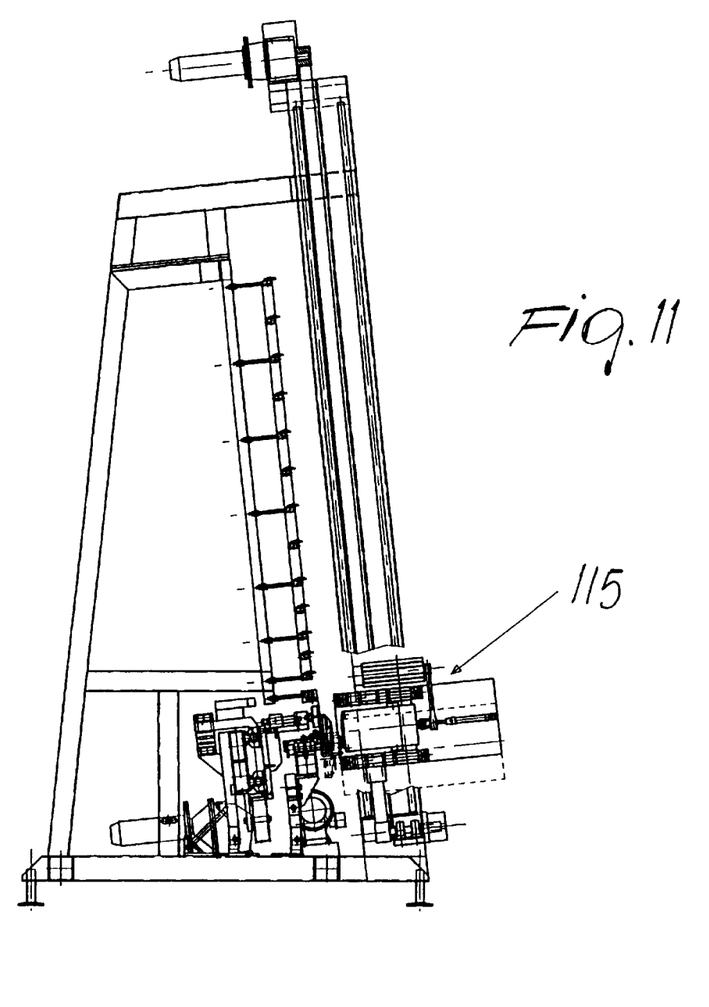
FIG. 11 is a side view of the elements of FIG. 1 and clearly shows the three movement axes, respectively the axis for the movement of the horizontal slider, the axis for the movement of the vertical slider, and the axis for the orientation of the spherical joint of the grinding head; the movement along all of the three axes is coordinated electronically so as to follow any perimeter to be treated and to appropriately orientate the head.
Figure 12:
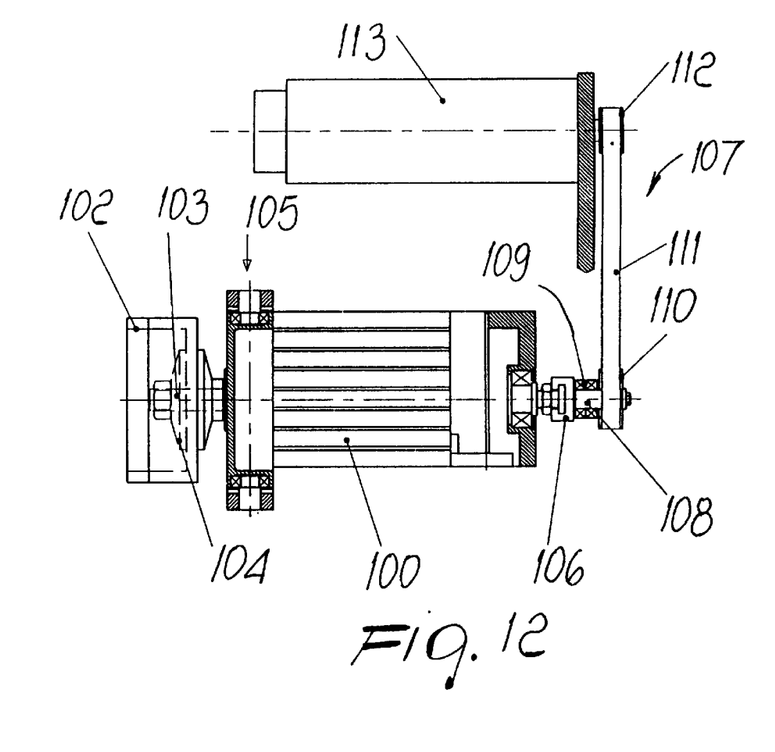
FIGS. 12, 13, and 14 are views, in greater detail, of one of the embodiments of the device according to the present invention, which substantially consists in the third axis shown in FIG. 11.
Figure 13:
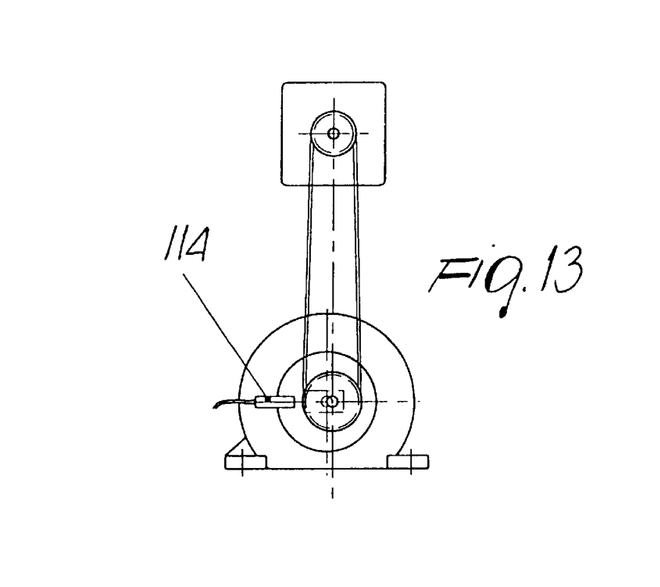
Figure 14:
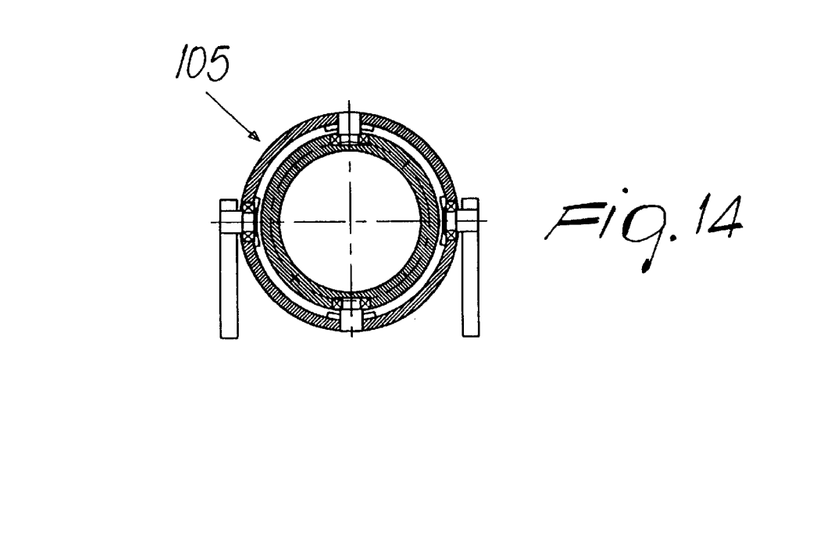

The entire unit that constitutes the device according to this solution is designated by the reference numeral 115 in FIGS. 10 and 11.

Figure 15:
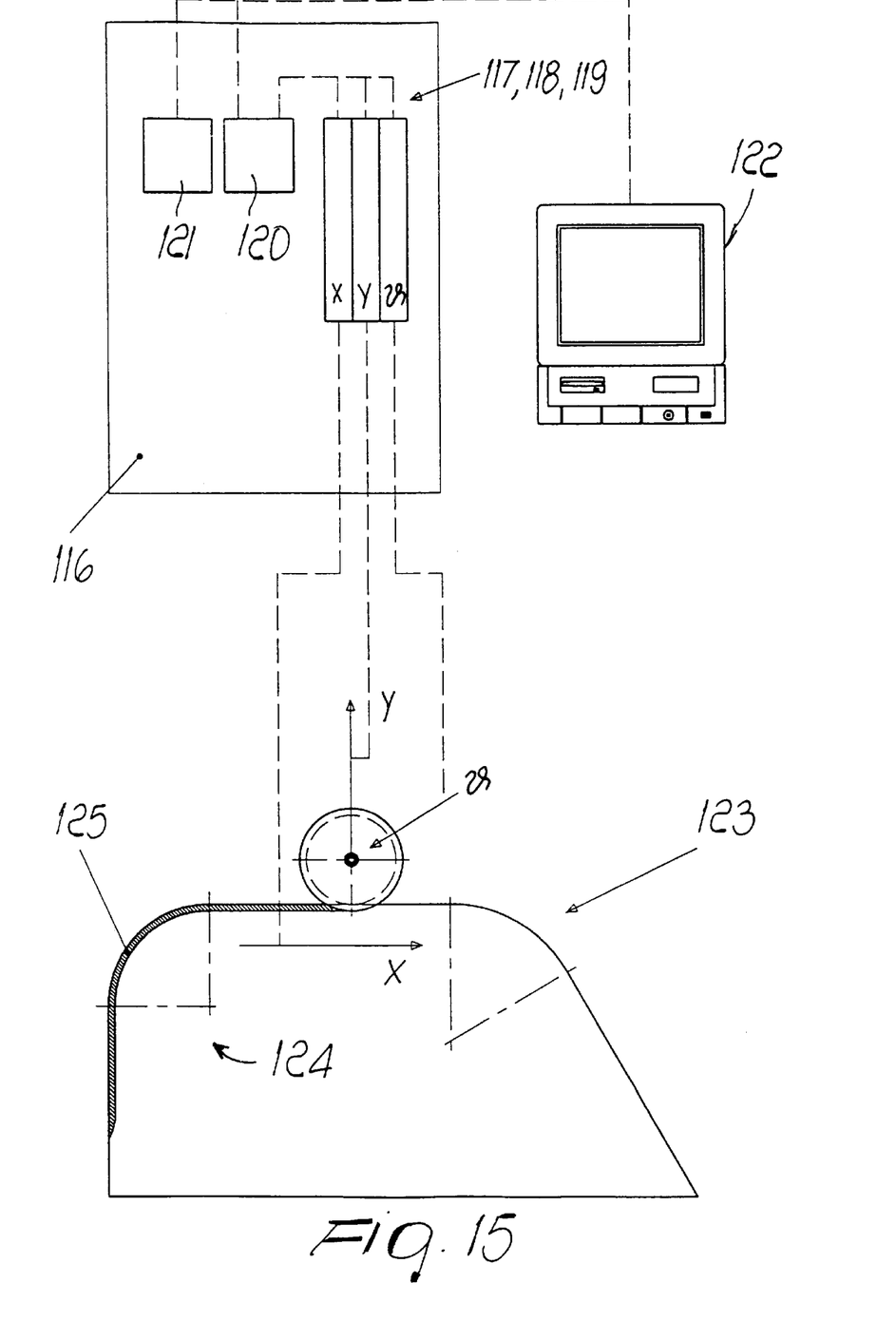
FIG. 15 is a view of the logic unit that controls the system.

An electronic panel 116 contains the three drive systems 117, 118, and 119 of the axes, a numeric control unit 120, and a sequential logic programmer 121 and controls all the operations of the machine; a computer 122 instead allows interfacing with the operator for command and parameter input, diagnostics, and statistics.

The glass plate 123 has been shown with regard to its portion 124 that remains inside the double glazing unit and is therefore affected by the so-called "low emissivity" coating, and with regard to its portion 125, where said coating has been removed or is being removed so that the face of the glass plate is adapted for the adhesion of the sealants that constitute the first seal (butyl sealant) and the second seal (polysulfide or polyurethane or silicone sealant), i.e., it does not have the coating film, the oxidation whereof, which would begin from the outer edge of the glass plate, would cause the separation of the sealants from the glass plate.

The materials and the dimensions constituting the individual components of the invention may of course also be the most pertinent according to the specific requirements, and the same applies to the sequentiality of the steps of the method.

What is claimed is:

1. A device for removing coatings from the surface of a glass plate, said device comprising:

a support for supporting a glass plate such that said glass plate lies in a support plane;

a head which is movable in a direction parallel to said support plane adjacent a rim portion of said glass plate supported in said support plane; and a motorized tool provided on said head, said tool being of a cup-shaped type and having an annular flat surface extending in a plane which is substantially parallel to said support plane for contacting the surface of the rim portion of said glass plate supported in said support plane for removing coatings on the surface of the rim portion of the glass plate without damaging the glass plate, said tool being rotatable about a rotation axis which extends substantially perpendicularly to said support plane such that said annular flat surface of said tool arranged for contacting the surface of the rim portion of said glass plate supported in said support plane rotates about said rotation axis.

2. Device according to claim 1, wherein said support comprises: a train of rollers and a rack for respectively downward and rear support of said glass plate and conveyance thereof to a reference position adjacent to said head; and a motorized belt, said head being associated with said motorized belt for being moved along a substantially vertical direction.

3. Device according to claim 2, further comprising a fixed head with a motorized tool, said glass plate being loadable onto said rack and conveyable up to said reference position for coating treatment at said movable head and said fixed head, said fixed head being arranged in an offset position with respect to the movable head so as to avoid interference therebetween.

4. Device according to claim 3, further comprising: a first carriage for horizontally feeding said glass plate, said carriage comprising suckers for engaging said glass plate on a surface lying opposite to the surface with coatings and for conveying the glass plate towards said movable and fixed heads; and a second carriage for vertical movement of said movable head along guides, said guides being associated with posts, said fixed head being rigidly coupled to a lower end of said posts by a plate; said movable head and said fixed head respectively having a first and a second cup-shaped grinding wheels constituting said tools, said grinding wheels being actuated by a motor, said motor being mounted on an adapted slider, said slider being movable axially with respect to a support of an actuator, said actuator comprising a pneumatic piston, said piston having a body rigidly coupled to said support, and a stem, said stem being associated with said slider, said guides being connected to said support.

5. Device according to claim 4, wherein said first grinding wheel and said second grinding wheel operate tangentially by contact of part of their flat face against the surface of said glass plate that bears said coating to be removed.

6. Device according to claim 1, further comprising at least one suction hood, said hood being adapted to remove minimal emissions of dust produced by microabrasion of said coating.

7. Device according to claim 1, wherein said head is adapted for treating a glass plate having any of a straight and a curved contour perimeter.

8. Device according to claim 3, comprising electronically-driven actuators for moving said glass plate and said head and for regulating, in a controlled fashion, conditions of acceleration and deceleration of said glass plate and of said head.

9. Device according to claim 2, wherein said head associated with said motorized belt is movable substantially vertically along a vertical bridge, said bridge being also movable horizontally for carrying out perimetral treatment of, and without moving, said glass plate.

10. Device according to claim 3, comprising a plurality of movable heads and a plurality of fixed heads with a plurality of grinding wheels at the respective head.

11. Device according to claim 7, further comprising a spherical fulcrum, said tool being coupled to said fulcrum for adjustably orientating said rotation axis with respect to the surface of the glass plate, said rotation axis being inclinable, with respect to a plane lying at right angles to said glass plate, in a first plane lying at right angles to the perimeter of the glass plate, in a second plane that lies at right angles to said glass plate and is tangent to the perimeter of said glass plate, and in both said first and second planes combined.

12. Device according to claim 11, wherein extents of orientation of said rotation axis are adjustable independently with any of a manual and servo/actuated mechanical systems.

13. Device according to claim 12, wherein the orientation of the rotation axis of said tool about said fulcrum is adapted automatically to any shape of the perimeter of the glass plate, through automation systems.

14. Device according to claim 10, wherein said tool is constituted by any of an abrasive grinding wheel, a brush, tampico, non-woven fabric, and other adapted material.

15. Device according to claim 3, comprising a plurality of heads operating simultaneously.

16. Device according to claim 10, comprising electronic systems comprising any of driving systems, sequential logic programmers, numeric control units, computers, for full automation of operations.

17. A device for removing coatings from the surface of a glass plate, said device comprising:

a support for supporting a glass plate such that said glass plate lies in a support plane;

a head which is movable in a direction parallel to said support plane adjacent a rim portion of said glass plate supported in said support plane;

a motorized tool provided on said head, said tool being of a cup-shaped type and having an annular flat surface for contacting the surface of said glass plate for removing coatings on the surface of the glass plate without damaging the glass plate, said tool being rotatable about a rotation axis which extends in a principle working condition substantially perpendicularly to said support plane; and orientation means for orientating said rotation axis away from said principle working condition perpendicular to said support plane.

18. Device according to claim 17 wherein said orientation means allow for said rotation axis to be selectively inclined in a tangent plane which is tangent to an edge of said glass plate and which is perpendicular to said support plane.

19. Device according to claim 18 wherein said orientation means allow for said rotation axis to also be selectively inclined in a orthogonal plane which is orthogonal to said tangent plane and which is perpendicular to said support plane.

20. Device according to claim 19 wherein said orientation means comprise a spherical fulcrum, said tool being coupled to said fulcrum for adjustably orientating said rotation axis with respect to the surface of the glass plate.

21. Device according to claim 20 wherein said head is movable in two mutually orthogonal directions both of which are parallel to said support plane.

* * * * *